April 16, 1963 W. BINDER ET AL 3,085,662

ELECTROMAGNETICALLY RELEASABLE SPRING BRAKE

Filed Feb. 2, 1961

Inventors
WILHELM BINDER
RUDOLF HAUER

By Toulmin & Toulmin

Attorneys

United States Patent Office 3,085,662
Patented Apr. 16, 1963

3,085,662
ELECTROMAGNETICALLY RELEASABLE SPRING BRAKE
Wilhelm Binder and Rudolf Hauer, Villingen, Black Forest, Germany, assignors to Binder Magnete K.G., Villingen, Black Forest, Germany
Filed Feb. 2, 1961, Ser. No. 86,820
Claims priority, application Germany Feb. 6, 1960
4 Claims. (Cl. 188—171)

This invention relates to electromagnetically releasable spring brakes of very small dimensions.

Spring-actuated brakes are known, the braking effect of which starts as soon as the current for the electromagnetic release device is shut off. Such brakes may have the form of either disc brakes, cone brakes, or shoe brakes.

Among the shoe brakes there are embodiments operating with one internal shoe which may be pivoted about a stationary pivot and which is pressed against the interior surface of the brake drum by means of a spring. In these known embodiments the spring force may be overcome by the magnetic force of a correspondingly arranged electromagnet, and thus the brake may be released.

It is the object of the present invention to provide a new and improved spring-actuated drum type brake with an internal brake shoe and an electromagnetic release device, such brake being of simple design, providing for easy operation, and producing a constant brake pressure at changing directions of rotation. The arrangement according to the invention may be used especially in all those cases where smaller rotating masses are to be stopped quickly and absolutely. This is the case for instance with small motors serving as stop motors in household appliances, such as washing machines, spin dryers, or the like.

According to the invention a spring loaded pivotable shoe is provided for the brake constituting at the same time a part of the magnetic circuit of the electromagnetic release device, namely preferably the movable armature thereof.

Since the shoe at the same time serves as armature, the space requirement of the release device is very limited, so that with the same space requirement as that of the known devices its effective brake surface may be correspondingly greater and consequently produce a correspondingly greater brake torque.

The invention is illustrated by way of example in the accompanying schematic drawings in which FIG. 1 is a cross-sectional view of a brake according to a first embodiment of the present invention;

In the drawings identical members are provided with the same reference numerals.

Figure 1:
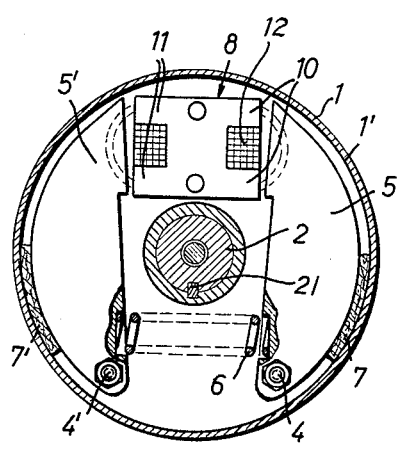

In the drawing the brakes according to the invention are illustrated, the brake drum thereof being denoted with reference numeral 1. 1' demonstrates the interior circumferential surface of this drum. No. 2 refers to the shaft of the brake. Drum 1 is secured to shaft 2 and rotates therewith. As may be seen especially from FIG. 3, two pivots 4 and 4', one for each brake shoe 5 and 5' are provided in stationary support plate 3 of the brake. As may be seen, the pivots are arranged close to the brake surface 1 in such a manner that each shoe is supported at one end on a pivot.

In all three embodiments the brake pressure is produced by a common spring. According to FIG. 1 spring 6 thereof is a compression spring which is supported on the two brake shoes 5 and 5' between the pivots 4 and 4', respectively and shaft 2. Spring 6 biases said jaws outwardly in such a manner that brake linings 7 and 7', respectively are pressed against the brake surface 1 of the brake drum.

In all three embodiments, on the opposite side of the shaft 2 an electro-magnetic release device 8 is mounted on the housing 3 by means of two bolts 9. Said device comprises a core having two pairs of poles 10 and 11. Furthermore supported on the core in the central portion is an electro-magnet coil 12. Thus the magnetic circuit of the release device 8 is open in the direction towards the two shoes 5 and 5'. The magnetic circuit is closed by the shoes themselves the ends 13 and 18 of which, located close to the core 8, for this purpose are constructed as armatures.

A very short path for the magnetic flux (see dotted flux lines) and thus very little lose of energy is obtained when the release device is provided with such a single magnet coil and such a pair of poles for each shoe as shown. The magnet flux flows from the one pole into the brake shoe and from there directly into the adjacent pole. The electro-magnet may be fed by direct current or alternating current alike, the latter being preferred because of the short switching times obtainable with it.

Figure 2:
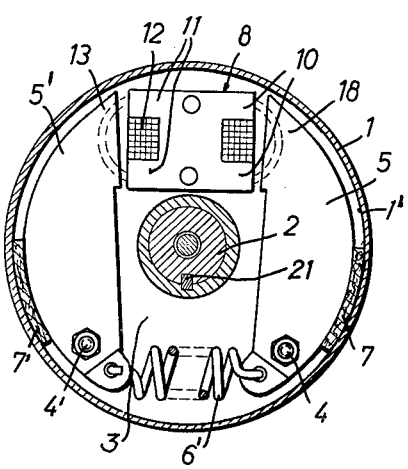
FIG. 2 is a cross-sectional view of the small spring brake according to another embodiment of the invention.
Figure 3:
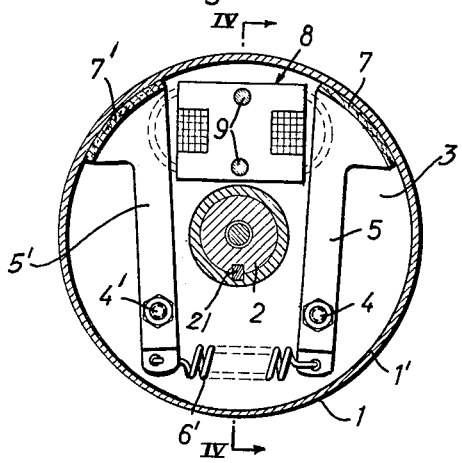
FIG. 3 is a cross-sectional view of a third embodiment of the present invention.
Figure 4:
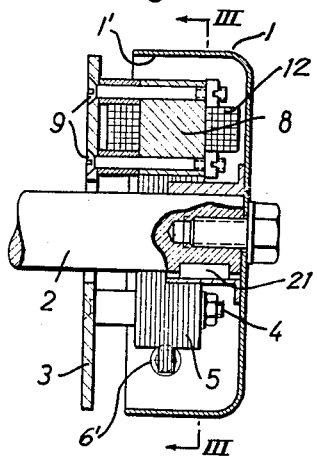
FIG. 4 is a longitudinal sectional view of the brake according to FIG. 3, taken along lines IV—IV.

In FIGS. 2 and 3 the spring 6' producing the brake pressure is a tension spring and consequently it is located on that side of the pivots 4 which is remote from the shaft 2. Provided there is sufficient space, a compression spring may, of course, also be disposed on the same side of the shaft 2 as the release device 8.

The novel arrangement has a particularly advantageous effect when two symmetrically arranged internal shoes are used as shown. In this case each shoe constitutes an armature member of the magnetic circuit of one and the same release device. The use of two internal shoes is of special advantage, particularly with changing directions of rotation, in that in both directions of rotation an increase in brake pressure is obtained which results from the friction effect between shoes 5 and 5' and brake means such as drum 1. This increase is brought about by the fact that in case of a certain direction of rotation, one of the two internal shoes is pressed against the friction surface of the drum by the frictional forces acting in tangential direction in addition to the effect of the spring. The single common spring 6 or 6' producing the brake pressure may be provided for both shoes. This spring engages both shoes directly and spreads them as shown.

It is also possible to provide a separate spring for each shoe.

We claim:

1. A spring actuated drum type brake, comprising a rotatable drum; two internal, pivotally mounted spring-loaded shoes arranged inside, and symmetrically with respect to the axis of said rotatable drum, for frictionally engaging said drum; and a stationary electro-magnetic release device including one magnetic core having two pairs of poles on opposite sides of the core, one for each shoe, and a common magnetic coil on said core, each pair of poles facing the extreme portion of one internal shoe which portion constitutes an armature bridging the two poles of said respective pair of poles when said magnetic coil is energized.

2. A brake according to claim 1 in which said core is of H-shape, with the magnetic coil surrounding the crosspart of said H-shaped core.

3. A brake according to claim 1 in which a common spring for said shoes producing the brake torque and engaging the shoes directly for spreading them is arranged eccentrically with respect to the axis of said brake-drum and adjacent to the pivots of said shoes, while said release device is arranged on the opposite side of said axis.

4. A brake according to claim 1, said two shoes being spring loaded for producing the brake torque, said spring engaging the shoes directly for spreading them.

References Cited in the file of this patent

FOREIGN PATENTS

| | | |
|---|---|---|
| 1,195,827 | France | May 19, 1959 |
| 541,310 | Great Britain | Nov. 21, 1941 |